March 18, 1952 — F. W. CALDWELL — 2,590,064
VERTICALLY OFFSET ROTARY WING AXES
Filed Oct. 17, 1946 — 2 SHEETS—SHEET 1
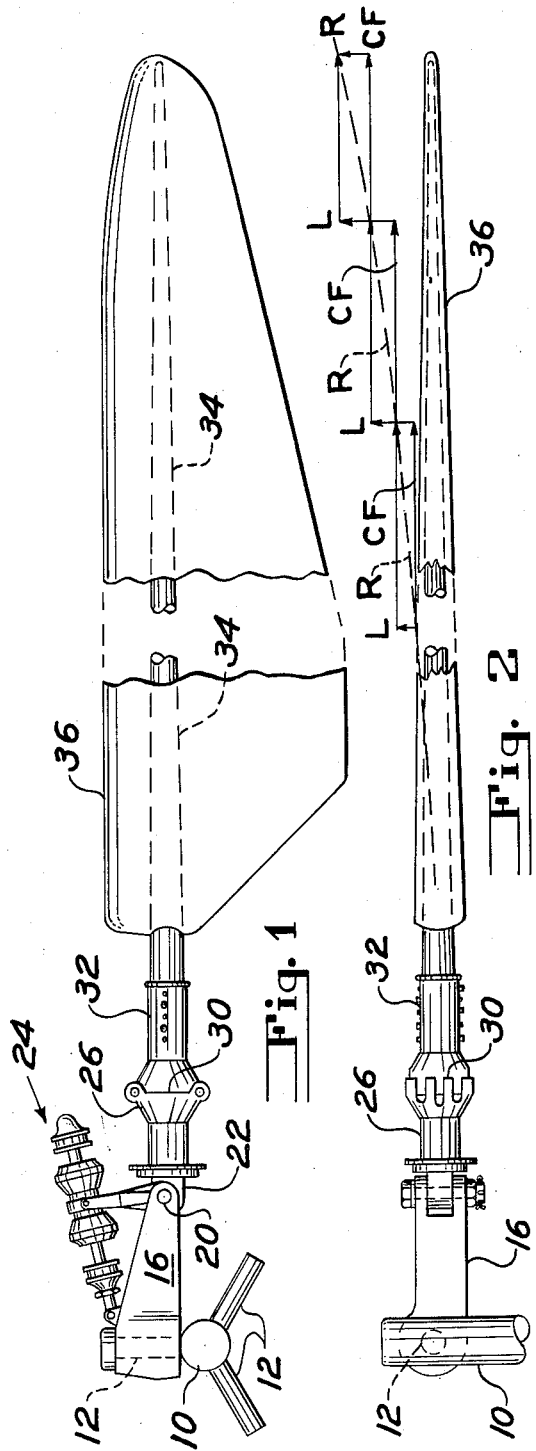
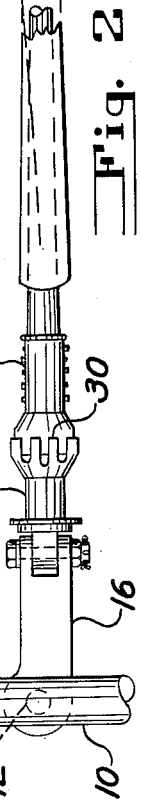
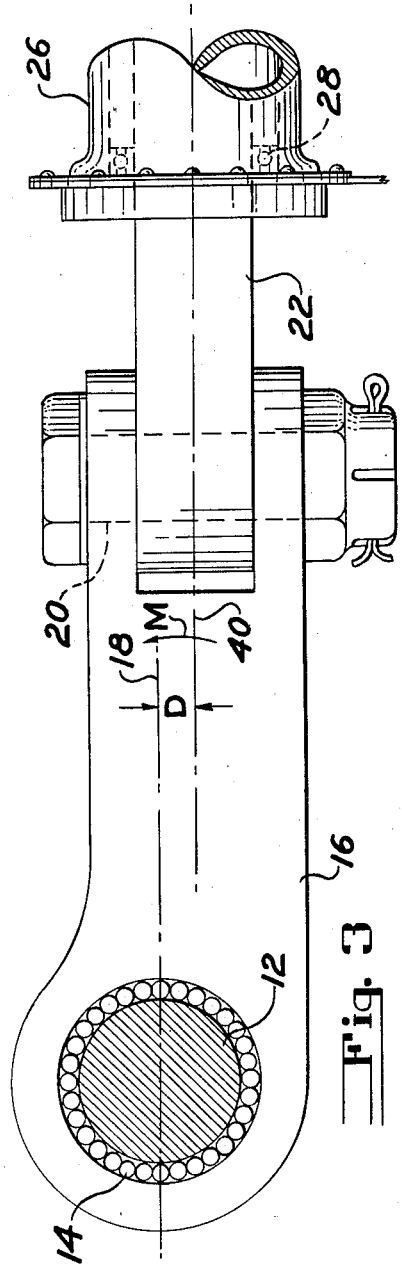
FRANK W. CALDWELL
INVENTOR
BY Charles L. Shelton
ATTORNEY

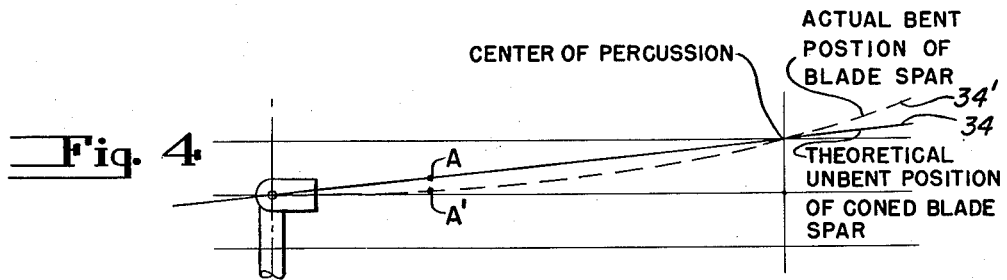
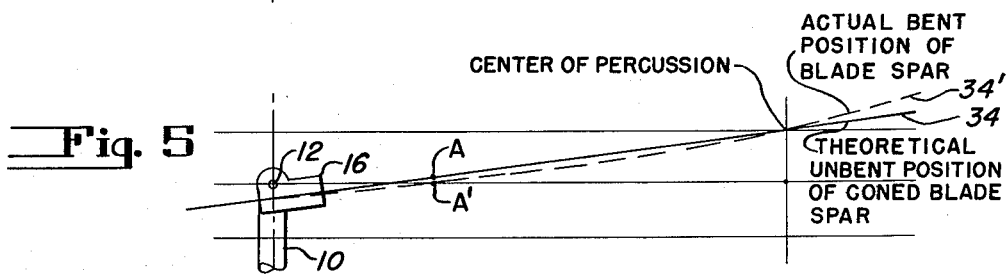
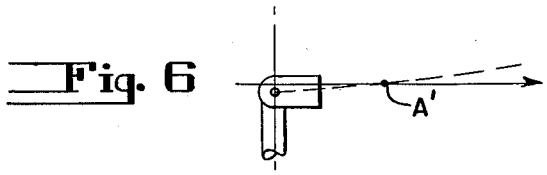
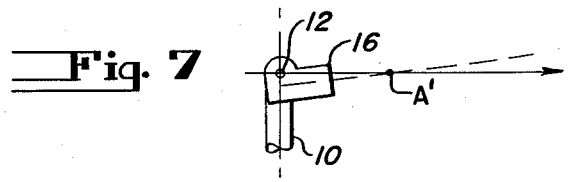

Patented Mar. 18, 1952

2,590,064

UNITED STATES PATENT OFFICE 2,590,064

VERTICALLY OFFSET ROTARY WING AXES

Frank W. Caldwell, West Hartford, Conn., assignor to United Aircraft Corporation, East Hartford, Conn., a corporation of Delaware Application October 17, 1946, Serial No. 703,896

5 Claims. (Cl. 170—160.56)

1

This invention relates generally to improved rotors for rotary wing aircraft, and more particularly to a mount for blades of rotors wherein the resultant of the dynamic and aerodynamic forces acting upon the blades is caused to align substantially with the longitudinal strength member, or spar.

In rotary wing air craft the rotor blades assume an angle during operation which is a resultant of several forces, probably the chief of which are lift and centrifugal forces. Because the outboard portion of the blades travel through the air at a high speed, the lift force is also high per unit of weight. The inboard portions travel through the air at progressively slower speeds as positions are taken more and more toward the hub. To enable the inboard portion of the rotor blade to assume the dynamic and aerodynamic forces, the root of the rotor blades, and the mounting structure therefore, are of substantially greater strength and weight than the outboard portions. Such construction, together with the phenomena of operation outlined above, causes the blade to bend during operation. Because of the differential of weight through the blade, the cyclic operation of blades during flight, and the inertia of the inboard parts, such bending has a tendency to concentrate at a node in the spar adjacent to its root.

An object of this invention is to provide structure for preventing or reducing the concentration of steady stresses in the strength member or members of rotor blades.

Other objects and features lie in the details of construction and arrangement of parts, and will be either obvious or pointed out in the following specification and claims.

In the drawings:

Figure 1 is a diagrammatic plan view of my invention;

Figure 2 is a side view thereof with diagrams superposed thereon;

Figure 3 is a detail view of a hinge used in a preferred form of the invention; and Figs. 4, 5, 6 and 7 are diagrammatic views illustrating the invention.

Referring more in detail to the drawing, a substantially vertical drive shaft may terminate at its upper end in a hub 10 to which any desired number of substantially horizontal blade mounting pins 12 are secured. There are three pins 12 shown in Figure 1, and each pin mounts one of a set of identical rotor blades. Therefore, only one rotor blade, its mounting, and its operation will be discussed in detail.

2

Journaled on each pin 12 by suitable bearings, such as needle bearings 14 for example, is a drag link 16. As best shown in Figure 3, the axis of the pin 12 is spaced upward of the link 16, the position of which axis relative to the link 16 is represented by a center line 18. The link 16, at its outer end, mounts a substantially vertical pivot 20, which secures a stub spar 22 to the link 16, and permits the spar 22 to move around the pivot 20. Such movement may be restrained by a damper 24, forming no particular part of the present invention, and being shown and described in detail in Patent No. 2,554,774 of Michael D. Buivid, issued May 29, 1951, and entitled "Damper for Rotary Wing Aircraft."

The stub spar 22 mounts a sleeve 26 upon bearings 28 which permit the rotor blade to be feathered through controls not shown. The sleeve 26 is equipped with a coupling 30 which engages the root 32 of a strength member or spar 34 for a rotor blade 36, which blade 36 may be secured by ribs or other suitable means to the spar 34.

As best shown in Figure 1, the rotor blade 36 is of heavier construction in its inboard portion than in its outboard portion, although other shapes may be used if desired. Also the spar 34 is heavier at its root 32 than it is at its outboard portion. The center line of the spar 34 is extended onto the drag link 16 and represented by a line 40 in Figure 3. It is to be noted that the lines 18 and 40 are separated by a distance D. The centrifugal forces of the blade 36 and the spar 34 will be transferred through the center line of the root 32 along the line 40, through the sleeve 26 and stub spar 22, through the pivot 20 to the drag link 16. This force will act around the pin 12 to cause the connecting parts mentioned above to tend to rotate the blade 36 upward. The distance D will determine the amount of this force. For a blade weighing approximately 55 pounds and turning at 200 R. P. M., it has been found that a distance of 0.25" for D will reduce steady stresses in the structure about 30%.

As best shown in Figure 2, the blade 36 responds to centrifugal force in accordance with the weight of the several portions of the blade and the speed of rotation of the blade. Such forces may be represented by lines bearing the character CF. The lift of any given portion of the blade may be represented by a line L. Completing the parallelogram of these forces, resultants R will be obtained. It is to be noted that the ratio of centrifugal force to lift force, varies as positions are taken more and more inboard of the blade. Accordingly, as the resultant R is drawn from the hub 10 out to the tip of the blade 36, the lift force and the centrifugal force ratio results in a curve, which stresses the blade spar 34 and the root 32 by bending them.

In vibrating bodies, it is well known that a body of less mass attached to a body of greater mass will vibrate with reference to the body of greater mass and that a node adjacent to the point of connection of the two masses will be formed. Because the inboard portion of the rotor blade and the connecting mechanism for the blade are necessarily of higher strength to resist the total centrifugal and aerodynamic force upon the blade, these parts are heavy with respect to the outboard parts of the blade. Accordingly, it has been found that the root 32 of a rotor blade may form a node of vibration in the case where the blade flaps up and down in operation.

Inasmuch as the force due to the offset hinge 12 tends to cause flexure of the connecting parts opposite in direction to the curve of the resultant R, the net force may be resolved substantially into a straight line. In other words, the inboard portion of the blade will be caused to ride higher due to a rotation moment M than it would without the offset hinge 12, and produce a bending opposite in direction to the normal bending.

The effectiveness of the improved offset hinge in reducing the stresses adjacent the root of the blade spar will be evident from an inspection of the two sets of contrasting Figures 4 to 7. Fig. 4 illustrates diagrammatically by a broken line 34' the actual bent position of a blade spar in the usual construction in which the flapping pivot is aligned with the spar axis, and also illustrates the theoretical unbent position of the coned blade spar by a solid line 34. It will be noted that, due to centrifugal forces acting on the concentration of weight in the heavier root portion of the spar at point A (see also Fig. 6), a severe downward bending moment is imposed on the blade adjacent the root of the spar which opposes the upward bending moment due to the lift forces acting on the blade. This downward bending moment will cause increased bending of the spar and result in increased stresses in the spar adjacent this concentrated weight.

Fig. 7 clearly illustrates the advantage of the offset hinge. The undesirable stress concentration adjacent the root of the spar is eliminated since the point A' representing the concentrated mass in the root portion of the spar lies on the radial line passing through the hinge axis of the blade. As a result less bending of the spar occurs. Fig. 5 illustrates diagrammatically by a broken line 34' the actual bent position of a blade spar in the improved construction in which the flapping pivot is offset above the spar axis, as well as the theoretical unbent position of the coned blade spar shown in solid line 34. It will be noted that the centrifugal forces acting on the concentration of weight in the heavier root portion of the spar at point A' imposes no bending moment on the blade adjacent the root of the spar as this radial force acts directly through the offset hinge axis and hence creates no bending moment. This will be evident from Fig. 5 which shows that the centrifugal force acting on mass A', as a result of the offset hinge, acts directly through the hinge axis and therefore has no bending moment. The offset hinge construction with its lack of bending moment results in a straighter spar under load as is clearly evident from Fig. 5 in which the spar is straighter than in Fig. 4, i. e., lies closer to the solid line 34 representing the theoretical unbent position of the coned blade spar.

With power operated blades, such as used in a helicopter, a drag force may also be balanced by a centrifugal force to cause a curved resultant force and bending of the rotor blade 36 when viewed in the plan. Accordingly, if such action is of a nature to cause excessive stress in the rotor blade, or parts thereof, or in connected parts, the drag pin 20 may be offset rearwardly of the axis 40 of the rotor blade so that compensation may also be provided for such drag forces.

While I have shown and described in some detail, one presently preferred modification of this invention, obviously other modifications and adaptations will occur to those skilled in the art. For this reason, I wish not to be limited in my invention only to the form shown and described, but by the scope of the following claims.

I claim:

1. In rotary wing aircraft including a rotor hub and a plurality of rotor blades, means for separately pivotally mounting each blade on said hub including a flapping hinge for each blade permitting independent flapping movement of each blade relative to the other blades into a plurality of coned positions of said blades, said flapping hinges having their hinge axes located above the longitudinal axes of the several blades.

2. In rotary wing aircraft including a rotor hub and a plurality of rotor blades, means for mounting said blades on said hub for a variable coning angle including a flapping hinge for each blade permitting independent flapping of each blade relative to the other blades, said rotor blades having their greatest mass adjacent their point of attachment to said hub, and said flapping hinges having their hinge axes spaced above the longitudinal axes of the respective blades.

3. In rotary wing aircraft including a rotor hub and a plurality of rotor blades each of which includes a longitudinal spar lying substantially in the longitudinal axis of the blade, blade root attaching means for securing the inboard end of said spar to said hub, whereby the greatest mass of said blades is concentrated adjacent the root attaching means thereof, means for pivoting said blade root attaching means to said hub including a flapping hinge for each blade permitting independent flapping movement of each blade relative to the other blades into various upwardly coned positions of said blades, the flapping hinges for said blades having their hinge axes spaced above the longitudinal axes of the blade spars of the respective blades.

4. In rotary wing aircraft including a rotor hub and a plurality of rotor blades, each of said blades having a lifting part having different weights in different portions, and said portions also being subjected to different lifting forces during operation, the lightest of the portions being subject to the greatest lifting forces and being disposed outermost from said shaft, and means for mounting said blades on said hub including a flapping hinge for each blade permitting independent flapping thereof relative to the other blades into a plurality of coned positions, said hinges having their hinge axes located above the longitudinal axes of the respective blades at said hub.

5. In rotary wing aircraft including a rotor hub and a plurality of rotor blades individually pivotally connected to said hub for flapping movement into a plurality of coned positions of said blades, each of said blades including an elongated spar and airfoil forming means secured to said spar, said spar assuming the aerodynamic and centrifugal force loads of said blade, said forces normally causing said spar to assume a curved shape during rotation, thereby stressing said spar, said flapping hinges having their axes located a substantial distance above the longitudinal axis of said spar at the point of attachment thereof to said hub whereby to reduce the bending stress upon said spar.

FRANK W. CALDWELL.

REFERENCES CITED

The following references are of record in the file of this patent:

UNITED STATES PATENTS

| Number | Name | Date |
|---|---|---|
| 2,197,677 | Bennett | Apr. 16, 1940 |
| 2,201,810 | Campbell | May 21, 1940 |
| 2,216,768 | Cierva | Oct. 8, 1940 |
| 2,234,196 | Prewitt | Mar. 11, 1941 |
| 2,264,942 | Larsen | Dec. 2, 1941 |
| 2,272,439 | Stanley | Feb. 10, 1942 |
| 2,369,048 | Hays | Feb. 6, 1945 |
| 2,420,823 | Hayes | May 20, 1947 |
| 2,426,130 | Wald | Aug. 19, 1947 |
| 2,457,429 | Young | Dec. 28, 1948 |
| 2,495,523 | Hays | Jan. 24, 1950 |